US011767603B2

(12) United States Patent
Ballantine et al.

(10) Patent No.: US 11,767,603 B2
(45) Date of Patent: Sep. 26, 2023

(54) MODULAR SYSTEMS FOR HYDROGEN GENERATION AND METHODS OF OPERATING THEREOF

(71) Applicant: OHMIUM INTERNATIONAL, Inc., Incline Village, NV (US)

(72) Inventors: Arne Ballantine, Incline Village, NV (US); Peter Light, San Francisco, CA (US); Albert Esser, Santa Cruz, CA (US); Chockkalingam Karuppaiah, Fremont, CA (US); Kirsten Burpee, San Jose, CA (US)

(73) Assignee: Ohmium International, Inc., Incline Village, NV (US)

( * ) Notice: Subject to any disclaimer, the term of this patent is extended or adjusted under 35 U.S.C. 154(b) by 73 days.

(21) Appl. No.: 17/101,251

(22) Filed: Nov. 23, 2020

(65) Prior Publication Data

US 2021/0156039 A1 May 27, 2021

Related U.S. Application Data

(60) Provisional application No. 62/938,511, filed on Nov. 21, 2019.

(51) Int. Cl.
*C25B 15/02* (2021.01)
*C25B 1/04* (2021.01)
*H02B 13/00* (2006.01)

(52) U.S. Cl.
CPC .............. *C25B 15/02* (2013.01); *C25B 1/04* (2013.01); *H02B 13/00* (2013.01)

(58) Field of Classification Search
CPC .. C25B 15/02; C25B 1/04; C25B 9/70; C25B 9/77; H02B 13/00; Y02P 20/129
See application file for complete search history.

(56) References Cited

U.S. PATENT DOCUMENTS

| 5,980,726 A | 11/1999 | Moulthrop, Jr. et al. |
| 8,669,499 B2 | 3/2014 | Conrad |

(Continued)

FOREIGN PATENT DOCUMENTS

| CN | 105036254 | 11/2015 |
| CN | 206872952 | 1/2018 |

(Continued)

OTHER PUBLICATIONS

PCT Application No. PCT/US2020/061771, International Preliminary Report on Patentability dated May 17, 2022.

(Continued)

*Primary Examiner* — Jafar F Parsa
(74) *Attorney, Agent, or Firm* — POLSINELLI PC (57) ABSTRACT

A modular system for hydrogen generation includes a plurality of cores and a hub. Each core includes an electrolyzer and a power supply. The power supply is operable to manage electrical power to the electrolyzer of the core and is redundant to the power supply of at least another one of the plurality of cores. The hub includes a water module, a heat exchange module, and a switchgear module. The water module includes a water source in fluid communication with the electrolyzer of each one of the plurality of cores, the heat exchange module includes a heat exchanger in thermal communication with the electrolyzer of each one of the plurality of cores, and the switchgear module includes a switch activatable to electrically isolate the power supply of each one of the plurality of cores.

18 Claims, 5 Drawing Sheets

(56) References Cited

U.S. PATENT DOCUMENTS

| | | |
|---|---|---|
| 11,492,711 B2 | 11/2022 | Ballantine |
| 2004/0045815 A1 | 3/2004 | Tseng et al. |
| 2005/0074657 A1 | 4/2005 | Rusta-Shallehy et al. |
| 2011/0259758 A1 | 10/2011 | Sioli et al. |
| 2013/0264195 A1 | 10/2013 | Zhou et al. |
| 2016/0068976 A1 | 3/2016 | Yoshida et al. |
| 2017/0050867 A1 | 2/2017 | Kang et al. |
| 2020/0010961 A1 | 1/2020 | Kazuno et al. |
| 2021/0156038 A1 | 5/2021 | Ballantine |

FOREIGN PATENT DOCUMENTS

| | | |
|---|---|---|
| CN | 109338394 | 2/2019 |
| EP | 2623640 B1 | 1/2019 |
| EP | 4061984 | 9/2022 |
| EP | 4061985 | 9/2022 |
| JP | 2023-502525 | 1/2023 |
| JP | 2023-502781 | 1/2023 |
| WO | WO2010048706 A1 | 5/2010 |
| WO | WO 2021/102401 | 5/2021 |
| WO | WO 2021/102405 | 5/2021 |

OTHER PUBLICATIONS

PCT Application No. PCT/US2020/061771, International Search Report and Written Opinion dated May 7, 2021.

PCT Application No. PCT/US2020/061776, International Preliminary Report on Patentability dated May 17, 2022.

U.S. Appl. No. 17/864,187, filed Jul. 13, 2022, Arne Ballantine, Systems and Methods for Hydrogen Recovery.

Notification of Transmittal of the International Search Report and the Written Opinion of the International Searching Authority for International Patent Application No. PCT/US2020/061776, dated Apr. 2, 2021, 9 pages.

Ballantine, A. et al., "Systems and Methods of Ammonia Synthesis," U.S. Appl. No. 17/101,224, filed Nov. 23, 2020.

Ballantine, A. et al., "Modular Systems For Hydrogen Generation And Methods Of Operating Thereof," U.S. Appl. No. 17/101,251, filed Nov. 23, 2020.

Chisholm, G. et al., "3D printed flow plates for the electrolysis of water: an economic and adaptable approach to device manufacture," Energy Environ. Sci., vol. 7, pp. 3026-3032, (2014) DOI: 10.1039/c4ee01426j.

U.S. Appl. No. 17/949,856, Non-Final Office Action dated Mar. 30, 2023.

U.S. Appl. No. 17/949,856, Notice of Allowance dated Jul. 24, 2023.

MODULAR SYSTEMS FOR HYDROGEN GENERATION AND METHODS OF OPERATING THEREOF

CROSS-REFERENCE TO RELATED APPLICATIONS

This application claims the benefit of U.S. Provisional Patent Application No. 62/938,511, filed on Nov. 21, 2019, the entire contents of which are incorporated herein by reference.

FIELD

The present disclosure is directed to chemical production in general and, more specifically, to modular systems for hydrogen generation.

BACKGROUND

Hydrogen is a common gas that has many uses, such as petroleum refining, metal treatment, food processing, and ammonia production. For industrial applications, hydrogen is generally formed from non-renewable energy sources, particularly methane. However, because of its combustibility in air, hydrogen is difficult to store and ship. Accordingly, hydrogen is generally used at or near the site of its production which, in turn, is limited by the local availability of non-renewable energy sources.

SUMMARY

According to one embodiment, a modular system for hydrogen generation includes a plurality of cores and a hub. Each core includes an electrolyzer and a power supply. The power supply is operable to manage electrical power to the electrolyzer of the core and is redundant to the power supply of at least another one of the plurality of cores. The hub includes a water module, a heat exchange module, and a switchgear module. The water module includes a water source in fluid communication with the electrolyzer of each one of the plurality of cores, the heat exchange module includes a heat exchanger in thermal communication with the electrolyzer of each one of the plurality of cores, and the switchgear module includes a switch activatable to electrically isolate the power supply of each one of the plurality of cores.

According to another embodiment, a method of controlling a modular system for hydrogen generation comprises monitoring a respective hydrogen production capacity of each core of a plurality of cores, each core including an electrolyzer and a power supply in electrical communication with one another; assessing energy available to the plurality of cores from one or more power sources; setting a respective operating set-point of each core in the plurality of cores such that the plurality of cores collectively meet a predetermined performance goal based on the hydrogen production capacity of each core and the energy available from the one or more power sources; and directing the available energy from the one or more power sources to the plurality of cores according to the respective operating set-point of each core.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Co-locating hydrogen production with its ultimate industrial use can present challenges of its own related to cost, safety, and throughput. Accordingly, there remains a need for hydrogen generation that can be carried out cost-effectively in plants amenable to safe implementation while providing robust throughput to meet demands of downstream applications, including at sites in resource-constrained areas. In the description that follows, various aspects of hydrogen generation systems and methods of operation are described in the context of electrolyzers arranged in cores having power redundancy and sharing connections with hub (i.e., e.g., site) modules that provide that provide water and electricity to the cores while receiving outputs of hydrogen, oxygen, and heat from the cores. This configuration facilitates cost-effectively scaling hydrogen from electrolysis to achieve throughputs suitable for industrial demand while also providing robustness with respect to availability of resources as well as failure and/or degradation of equipment.

As used herein, the term "module" and variations thereof shall be understood to include a discrete unit (e.g., housed in a cabinet or other similarly enclosed structure) connectable (e.g., via external or otherwise easily accessible connectors) in electrical communication, fluid communication, and/or thermal communication, as appropriate, with one or more other elements of a system to provide an aspect of the overall functions of operating and/or maintaining the system to generate hydrogen. Thus, for example, each module may be replaceable through disconnection only of one or more electrical connections, fluid connections, or thermal connections, as the case may be, and reestablishment of the respective connections to another instance of the same type of module. These connections may include connections that are standardized at least between modules of the same type to reduce the amount of time and training required to change modules. Further, or instead, each module may have a form factor amenable to portability (e.g., by fork lift or hand truck) within a plant. Thus, for example, a water module shall be understood to include a pump and a filter in fluid communication with one another and with connectors securable in fluid communication with a water source (e.g., a source outside of the plant) and with a plurality of electrolyzers such that the equipment in the water module may distribute water among the plurality of electrolyzers.

Further, or instead, unless otherwise specified or made clear from the context, each of the modules described herein may be present in redundancy to reduce the likelihood of unscheduled interruptions resulting from equipment failure in one module. In this context, redundancy shall be understood to include multiple instances of the same type of module and/or the presence of an auxiliary source of the electrical communication, fluid communication, and/or thermal communication provided by the given module. For the sake of clarity of illustration and explanation, however, redundancy in the form of multiple instances of a given type of hub module is generally not shown. Redundancy in the form of auxiliary equipment is shown to the extent that is informative with respect to describing certain aspects of the system.

In general, unless otherwise stated or made clear from the context, each instance of a core and/or a module of a given type may be swapped with another instance of a module of a given type without the need for an unscheduled interruption in hydrogen production by the overall system. Further, or instead, in the event of degradation or failure of a core or a module of a given type, auxiliary functionality may be provided by one or more other elements of the system to reduce or eliminate degraded performance of the system between scheduled interruptions in hydrogen production by the system. It shall be appreciated, however, that the term "uninterruptable" shall be understood in the context of foreseeable failures and/or degradations of equipment and may not include unforeseen or catastrophic events. Thus, in one embodiment, the overall performance (i.e., hydrogen generation) of the system may be uninterruptable. This is significant for robustness in meeting industrial-scale production volumes useful for achieving cost-effectiveness in hydrogen production and/or in one or more downstream applications, such as ammonia synthesis from hydrogen or use of hydrogen in a chemical or semiconductor device manufacturing facility. That is, down time of the system is generally associated with cost—namely, the cost of the equipment and operation of the system that is not being offset by a corresponding production of hydrogen. Thus, in facilitating uninterruptable production of hydrogen, the modularity of the system may contribute to cost effectiveness of certain hydrogen production techniques.

As used herein, the term "application" shall be understood to include any one or more of various different downstream uses of hydrogen, oxygen, and/or heat formed by the system and, thus, may include local use of such hydrogen, oxygen, and/or heat in a co-located plant. For example, any one or more of the various different systems and methods described herein may be used to generate hydrogen, oxygen, and/or heat to an application including ammonia synthesis. As a more specific example, an application within the context of the present disclosure shall be understood to include ammonia synthesis as part of any one or more of the various systems and methods described in a U.S. patent application Ser. No. 17/101,224 filed on Nov. 23, 2020, entitled "SYSTEMS AND METHODS OF AMMONIA SYNTHESIS" by Ballantine et al., the entire contents of each of these references incorporated herein by reference.

Figure 1A:
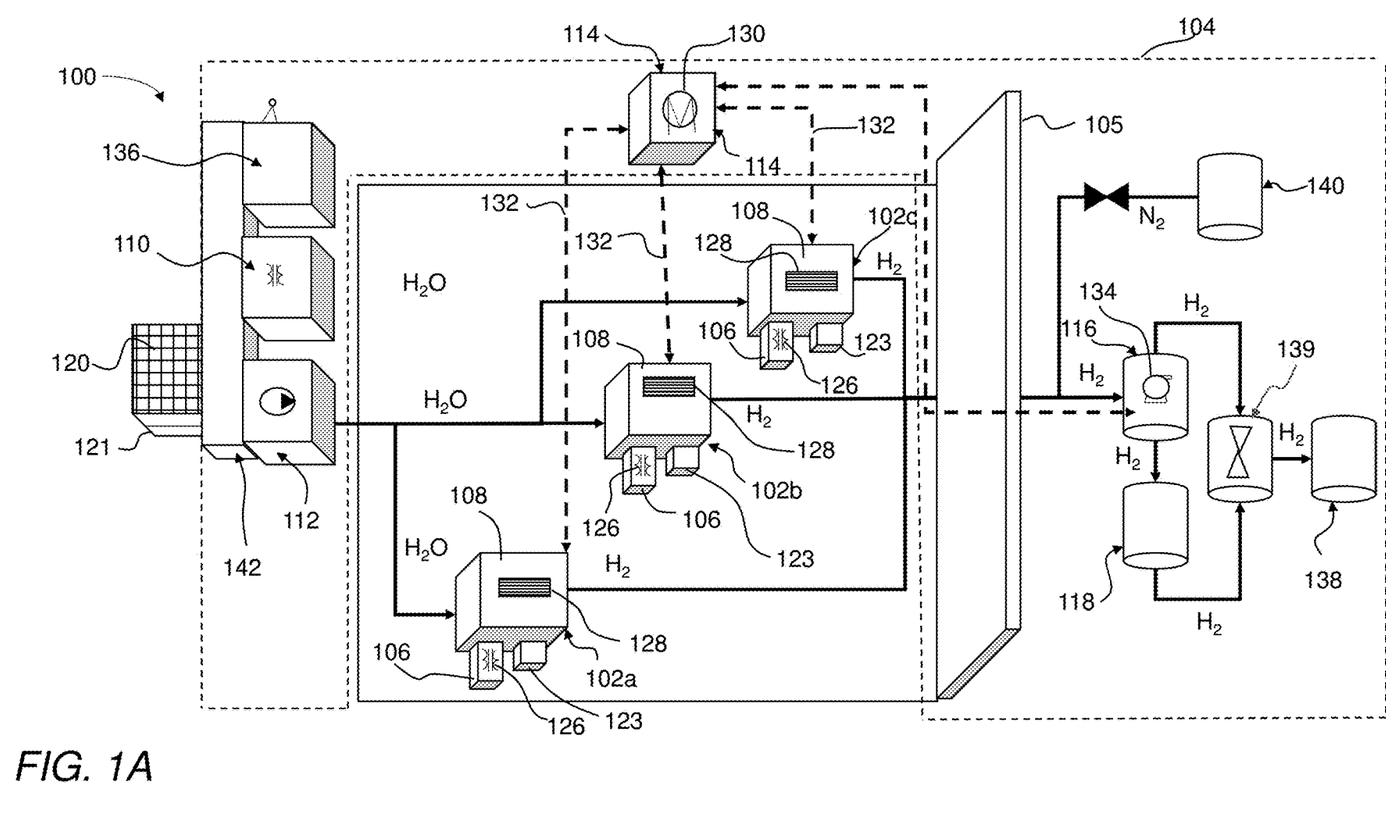
FIG. 1A is a schematic representation of a system including a plurality of cores and a hub, with a portion of the hub portioned by a wall, the schematic representation depicting fluid communication and thermal communication between the hub and the plurality of cores.
Figure 1B:
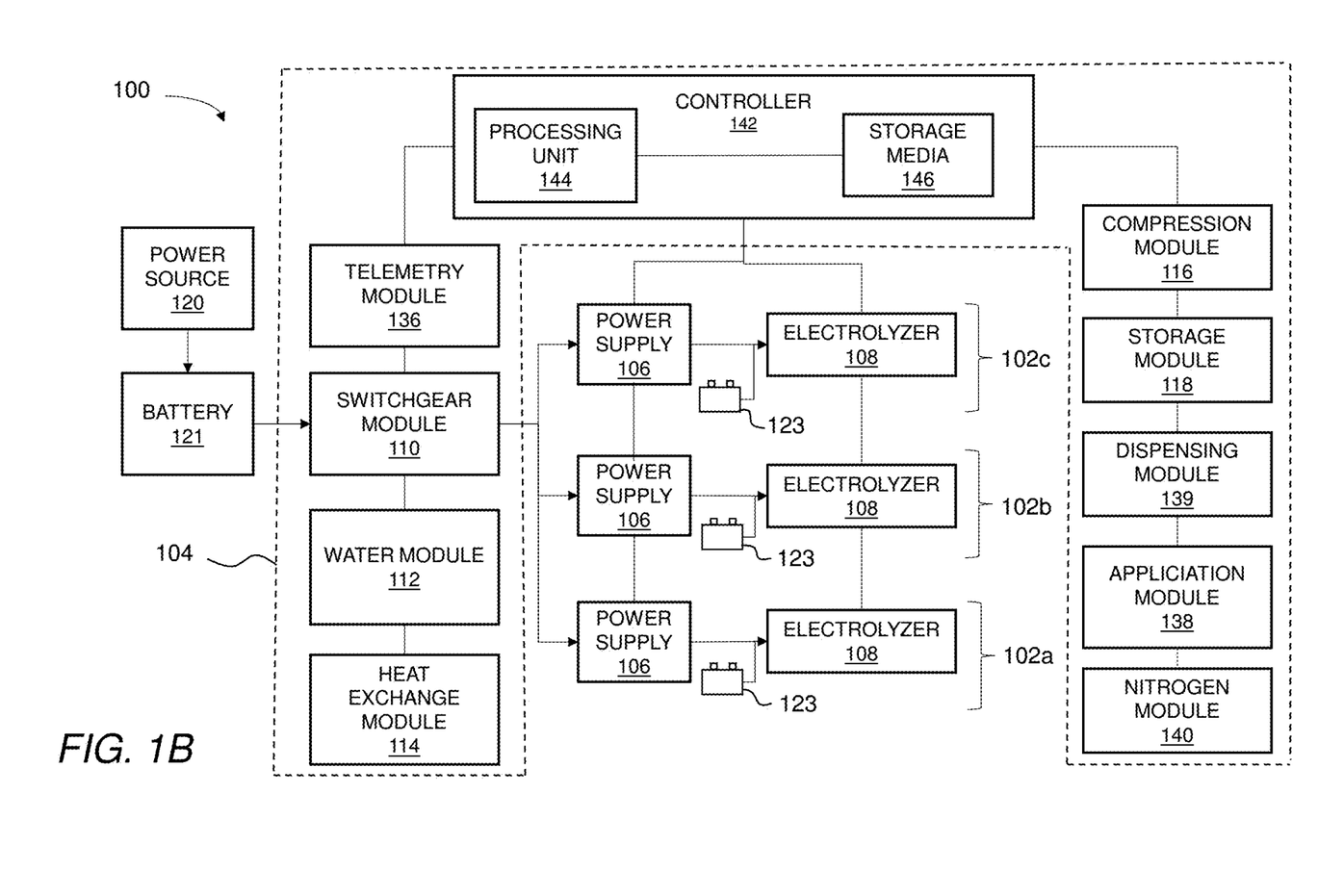
FIG. 1B is a block diagram of the system of FIG. 1A depicting electrical communication between the hub and the plurality of cores.

Referring now to FIGS. 1A and 1B, a system 100 for generating hydrogen may include a plurality of cores 102$a$, $b,c$ (e.g., core modules, referred to collectively as the plurality of cores 102$a,b,c$ and individually as the core 102$a$, the core 102$b$, and the core 102$c$), a hub (e.g., site modules) 104, and a wall 105 (e.g., a fire-rated structure) partitioning at least a portion of the hub 104 in which pressurized hydrogen is stored or processed, from the remainder of the hub 104 and the plurality of cores 102$a,b,c$ to provide protection from inadvertent conditions resulting in fire and/or explosion. While the plurality of cores 102$a,b,c$ are shown and discussed herein as including three cores, it shall be appreciated that this is for the sake of clear and efficient explanation and any number of cores may be used without departing from the scope of the present disclosure. The plurality of cores 102$a,b,c$ may be in electrical communication, fluid communication, and thermal communication with the hub 104 such that the hub 104 may serve as a centralized resource for distributing electricity, water, and/or cooling to the cores 102$a,b,c$ individually and collecting hydrogen, oxygen, and/or heat individually produced by the cores 102$a,b,c$. For example, each one of the core 102$a$, the core 102$b$, and the core 102$c$ may include a respective instance of a power supply 106 and an electrolyzer 108 in electrical communication with one another. The hub 104 may include a switchgear module 110, a water module 112, a heat exchange module 114, a compression module 116, and a storage module 118. The power supply 106 of each one of the plurality of cores 102$a,b,c$ may be in electrical communication with a power source 120 via the switchgear module 110 of the hub 104 to receive electricity as an input for electrolysis of hydrogen. The switchgear module 110 may include any one or more of a transformer, a circuit breaker, a switch, or other hardware useful for interrupting power to each power supply 106 of the plurality of cores 102$a,b,c$ to protect equipment of each of the core 102$a$, the core 102$b$, and the core 102$c$ and, in some instances components of the hub 104, from anomalies (e.g., a surge) in power provided from the power source 120. The electrolyzer 108 of each one of the plurality of cores 102$a,b,c$ may be in fluid communication with the water module 112 of the hub 104 to receive water as an input for electrolysis of hydrogen. At least the electrolyzer 108 of each one of the plurality of cores 102$a,b,c$, may receive cooling (e.g., a heat transfer medium, for example, a cooling liquid, such as ethylene glycol, propylene glycol or cooling water) from the heat exchange module 114 to remain at a temperature (e.g., greater than about 0° C. and less than about 100° C.) suitable for electrolysis of hydrogen. Further, the hydrogen output of the plurality of cores 102*a,b,c* may be in fluid communication with one or more hydrogen-handling modules of the hub 104 that may be separated from the remainder of the system 100 by the wall 105. As an example, the electrolyzer 108 of each one of the plurality of cores 102*a,b,c* may be in fluid communication with the compression module 116 for compressing hydrogen which, additionally or alternatively, may be in fluid communication with a storage module 118 for storing hydrogen for subsequent use. Such centralization of functions of the hub 104 may be useful for, among other things, providing conditioned inputs for electrolysis and achieving economy of scale in sizing various aspects of the hub 104 described in greater detail below.

In use, as also described below, the system 100 may include certain redundancy useful for reducing the likelihood of unscheduled interruptions that may otherwise arise from coupling multiple electrolyzers together to form hydrogen from electrolysis on an industrial scale. For example, the power supply 106 of each one of the plurality of cores 102*a,b,c* may be redundant to the power supply 106 of at least another one of the plurality of cores 102*a,b,c*. As a more specific example, the power supply 106 of the core 102*a* may be in further electrical communication with the electrolyzer 108 of the core 102*b* such that the power supply 106 of the core 102*a* may provide power to the electrolyzer 108 of the core 102*b* in the event of a failure of the power supply 106 of the core 102*b*. The system 100 may include analogous redundancy for the core 102*a* and the core 102*c*.

In addition to uninterrupted operation facilitated by redundancies with respect to the supply of power and/or any one or more of various different conditioned inputs from the hub 104, cost-effective operation of the system 100 may be a function of the power source 120 that provides electricity to each instance of the electrolyzer 108. For example, the power source 120 may include multiple types of electricity generators that may be advantageously operated in parallel and/or individually at different times of the day. For example, in certain installations, the power source 120 may include the electrical grid and, even in locations in which the electrical grid is reliable, it may be useful to switch to local sources of electricity to make use of lower-cost electricity. Examples of such local sources include, but are not limited to, one or more of a diesel generator, a natural gas-fired generator, a generator powered by biofuel sources such as bio-methane, an ethanol fired generator, a gasoline fired generator, a propane fired generator, a photovoltaic array, a wind power generator (e.g., one or more wind turbines), a hydroelectric generator or turbine (e.g., tidal or dam type), a geothermal power generator, a thermoelectric power generator, a heat engine (e.g., a turbine, piston engine, or other engine which uses heat and/or fuel as an input), or a fuel cell power generator.

As may be appreciated from these foregoing examples, the power source 120 may include local sources that are nominally continuous and/or intermittent. Thus, in the case of intermittent electricity availability from a local source such as a photovoltaic array, the power source 120 may preferentially be the local source when power from the local source is available without separate storage. Additionally, or alternatively, the system 100 may include a battery 121 in electrical communication with at least each instance of the electrolyzer 108 of the plurality of cores 102*a,b,c* (e.g., via the power supply 106), such as may be useful for managing variations in power from one or more intermittent power sources by storing excess power from the local source when the excess power is available (e.g., during daytime from a photovoltaic array) and then releasing it to the plurality of cores when the excess power is not available (e.g., during nighttime). As another example, in certain locations, the electrical grid may be unreliable or nonexistent such that the power source 120 primarily or exclusively includes any one or more of various different local sources, such as those listed above.

As may be appreciated from each of the foregoing scenarios—that is, both with and without the benefit of a reliable electrical grid—the power supply 106 may condition and control electricity in any one or more of various different AC power or DC power formats receivable from the power source 120. In general, therefore, the power supply 106 may include circuitry 126 to convert electric current from the power source 120 to a power format (current, voltage, and frequency) useable to power the load of the electrolyzer 108 of a respective one of the core 102*a*, the core 102*b*, or the core 102*c* for which the power supply 106 is the primary supply of power. The circuitry 126 may include, for example, any one or more of various different rectifiers and/or transformers useful for changing power formats according to any one or more of various different well-known techniques. That is, the circuitry 126 may receive electricity from the power source 120 in a one form and convert this form of electricity to another form suitable for use by the electrolyzer 108 of one of the core 102*a*, the core 102*b*, or the core 102*c*.

In instances in which the electrolyzer 108 runs on DC power and the power source 120 (e.g., a power grid or diesel generator) provides AC power, the circuitry 126 may include an inverter which converts AC power to DC power, and a DC/DC converter which controls the flow of the rectified DC power to the electrolyzer 108. As an example, the circuitry 126 may receive AC power from an electrical utility or a wind turbine, such as an AC connection to a transformer (e.g., a step-up, step-down, zig-zag, other isolation creating transformer) or inverter output or rotating generator output. As an example, the circuitry 126 may produce DC power from a rectifier/inverter fed by an AC power supply. Additionally, or alternatively, the circuitry 126 may produce multipolar DC power such as a bipolar arrangement of approximately −400 VDC, neutral, and +400 VDC.

In certain instances, the power supply 106 may be connected to an AC utility feed and/or one or more other AC sources (e.g., generators, wind power, etc.) with only one power processing stage. The single power processing stage may be, for example, single phase pulse-width modulation or power factor corrected. Additionally, or alternatively, the single power processing stage may be three-phase pulse width modulation or power-factor corrected (e.g., Vienna rectifier), and include full bridge without neutral connection powering one electrolyzer stack or a full bridge with neutral connection for powering plural electrolyzer stacks.

Additionally, or alternatively, the circuitry 126 may include fault protection, such as short fusing or short circuit sensing to facilitate safe and reliable operation of the power supply 106. In certain instances, the power supply 106 may provide 400 VDC (at full rated power) to the electrolyzer 108. Further, or instead, the power supply 106 may provide two different types of power to the same instance of the electrolyzer 108, as may be useful for powering auxiliary devices associated with operation, monitoring, and/or safety of the electrolyzer 108. For example, each power supply 106 is configured to provide a first DC voltage to the electrolyzer 108 of the core 102 and to provide a second DC voltage lower than the first DC voltage to auxiliary devices of the core 102. Thus, returning to the example of 400 VDC, the power supply 106 may provide 400 VDC to a portion of the electrolyzer 108 (e.g. to an electrochemical stack described in greater detail below) while providing 24 VDC to auxiliary devices (e.g., valves or blowers) of the core 102 and/or to sensor wiring for safety logic. As another example, the power supply 106 may provide split DC to a portion of the electrolyzer 108 with balancing DC/DC.

In instances in which the electrolyzer 108 runs on DC power and the power source 120 (e.g., a photovoltaic array) or a battery 121 provides DC power, then the inverter/rectifier may be bypassed, and the DC power may be provided directly from the DC power source or battery to the DC/DC converters of the circuitry 126, and then to the electrolyzers 108. Thus, the circuitry 126 is configured to operate the electrolyzers 108 on AC power from an AC power source, on DC power from a DC power source, or from both AC and DC power at the same time by rectifying the AC power to DC power using an AC/DC inverter, and then controlling the DC power magnitude that is provided to the electrolyzers 108 using a DC/DC converter.

Further, or instead, the power supply 106 may be sized to power the load of the electrolyzer 108 corresponding at least another one of the plurality of cores 102a,b,c for which the power supply 106 provides redundancy. In the interest of clarity and efficiency, the description that follows assumes that each electrolyzer 108 in the plurality of cores 102a,b,c operates at the same nominal voltage and current. Indeed, such uniformity across instances of the electrolyzer 108 may facilitate achieving redundancy with an efficient hardware configuration. However, unless otherwise specified or made clear from the context, however, it shall be understood that some instances of the electrolyzer 108 may operate ad different voltage and frequency from one or more other instances of the electrolyzer 108 without departing from the scope of the present disclosure.

In certain instances, the power supply 106 may be hot swappable while the respective instance of the electrolyzer 108 of the core 102a, the core 102b, or the core 102c is in operation and, more specifically, generating hydrogen from electrolysis of water using electricity. Here, it shall be appreciated that such hot swapping the power supply 106 may be facilitated by the redundancy provided by the instances of the power supply 106 that is not being hot swapped. That is, while an instance of the power supply 106 is being replaced, one or more other instances of the power supply 106 may provide power to the instance of the electrolyzer 108 that would otherwise receive power from the instance of the power supply 106 that is being replaced. As may be appreciated from the foregoing example, therefore, the redundancy provided by the instances of the power supply 106 in the plurality of cores 102a,b,c facilitates maintenance and/or repair each instance of the power supply 106 without interruption of hydrogen production.

In general, the electrolyzer 108 may include an electrochemical stack 128 into which electricity may be directed to form hydrogen and oxygen from water using electrolysis. More specifically, the electrochemical stack 128 may receive water from the water module 112, and the electrochemical stack 128 may be activatable through electrical power from the power supply 106 to direct at least a portion of the power from the power supply 106 to electrolyze the water in the electrochemical stack 128 to form hydrogen and oxygen. Examples of the electrochemical stack 128 include, but are not limited to, a proton exchange membrane (PEM) stack, a solid oxide electrolysis cell, an alkaline cell, or a combination thereof. In a PEM electrolyzer cell, water is provided to the anode electrode side of the membrane (i.e., electrolyte), and under the applied current or voltage provided between the anode and cathode electrodes, hydrogen diffuses from the anode electrode side to the cathode electrode side of the membrane to generate a hydrogen product. Oxygen and excess water are output from the anode electrode side of the PEM electrolyzer cell. As a more specific example, the electrolyzer 108 may include any one or more of the various different aspects of the devices and systems described in a U.S. patent application Ser. No. 17/101,232 filed on Nov. 23, 2020, entitled "ELECTROCHEMICAL DEVICES, MODULES, AND SYSTEMS FOR HYDROGEN GENERATION AND METHODS OF OPERATING THEREOF," by Ballantine et al., the entire contents of each of these references incorporated herein by reference.

In addition to producing hydrogen, the electrochemical stack 128 may also produce oxygen and heat. One or both of these may have independent value. For example, the oxygen from the electrochemical stack 128 may be collected and used in one or more other local or distributed applications in which oxygen is an input. Additionally, or alternatively, the heat removed from the electrochemical stack 128 may be used locally to improve, for example, efficiency in one or more aspects of the system 100. For example, as described in greater detail below, heat recovered from the electrochemical stack 128 may be used to generate electricity in some instances.

In some implementations, each one of the plurality of cores 102a,b,c may further include an auxiliary power source 123 in electrical communication with the respective instance of the electrolyzer 108 of the given core. The auxiliary power source 123 may provide power to the electrolyzer 108 during start-up, shut-down, and/or stand-by modes. Further, or instead, the auxiliary power source 123 may provide power to the electrolyzer 108 in instances in which the power source 120 becomes interrupted, with the auxiliary power source 123 sized to allow for safe shut-down in some cases or sized to allow for sustained operation of the electrolyzer in other cases. As an example, the auxiliary power source 123 may include a battery. As another example, the auxiliary power source 123 may include a fuel cell in fluid communication with the storage module 118 to receive hydrogen used to power the fuel cell. Continuing with the example of the auxiliary power source 123 including a fuel cell, the fuel cell and the corresponding electrolyzer may share a balance of plant and/or power conditioning system. The auxiliary power source 123 may be electrically connected to an electric power bus which electrically connects the power source 120 to the respective power supply 106, and/or to an electric power bus (such as a DC power bus) which electrically connects the power supply 106 to the respective electrolyzer 108 in the same core 102, as shown in FIG. 1B.

In general, the heat exchange module 114 may include a heat exchanger 130 sized for removing heat from at least a subset of the plurality of cores 102a,b,c. Given that the heat exchange module 114 is modular, it shall be appreciated that additional instances of the heat exchange module 114 may be added to the system 100 as additional instances of one of the plurality of cores 102a,b,c are added over time to accommodate increased hydrogen demand or to make up for degraded performance of any one or more of the plurality of cores 102a,b,c over time, as discussed in greater detail below. Further, or instead, in the context of the heat exchange module 114, redundancy may include complete redundancy in the event of a catastrophic failure of an instance of the heat exchange module 114. In certain instances, redundancy in the heat exchange context may include additional heat removal capacity to account for transient operation.

The heat exchange module 114 may, in some cases, further include a thermal loop 132 shown in FIG. 1A. For example, the heat exchanger 130 may be in thermal communication with each one of the plurality of cores 102*a,b,c* via the thermal loop 132. As a more specific example, the heat exchanger 130 may include a reservoir of cooling fluid (e.g., glycol or water), and the cooling fluid may move through the thermal loop 132 to pass over the plurality of cores 102*a,b,c* to remove heat during steady-state operation (or to add heat in the case of start-up under certain conditions). This type of heat exchanger may be particularly useful for providing a large amount of cooling capacity in a small foot-print as compared to an air heat exchanger. Further, or instead, liquid heat exchange may be useful for controlling temperature of the plurality of cores 102*a,b,c* in the event of variations of the ambient environment around the system 100.

In certain implementations, the heat exchange module 114 may convert low quality heat from the plurality of cores 102*a,b,c* into higher quality heat deliverable to one or more other portions of the system 100, such as to the hub 104. For example, the heat exchanger 130 and the thermal loop 132 may form at least a portion of a heat pump operable to convert waste heat from the plurality of cores 102*a,b,c* to higher quality heat as a working fluid (e.g., a refrigerant) which moves (e.g., under the force of a compressor) between the plurality of cores 102*a,b,c* and the heat exchanger 130 via the thermal loop 132. The higher quality heat harvested by the heat pump at least partially formed by the heat exchanger 130 and the thermal loop 132 may be directed, for example, to the storage module 118 to reduce the likelihood of freezing of conduits and/or valves of the storage module 118 as hydrogen expands upon release.

While the heat exchange module 114 may advantageously harvest heat for use in other portions of the system, other uses of harvested heat are additionally or alternatively possible. For example, the heat exchange module 114 may direct waste heat (e.g., at about 70° C.) from the plurality of cores 102*a,b,c* to ground-source cooling in an organic Rankine cycle to create electricity for use by the system 100, thus boosting overall efficiency. Such electricity generation may further, or instead, contribute to providing uninterruptable power to the plurality of cores 102*a,b,c* by providing a time-phase shifting of the energy.

In certain instances, waste heat removed by the heat exchange module 114 may be used to improve efficiency of the water module 112. For example, waste heat removed by the heat exchange module 114 may be used to drive a water capture subsystem in the water module 112 to remove moisture from air and, thus, reduce the overall water requirements of the system 100. As another example, waste heat removed by the heat exchange module 114 may be used to drive a water purification process in the water module 112.

While the heat exchange module 114 may generally manage temperature of each instance of the electrolyzer 108, it shall be appreciated that other heat transfer schemes may be additionally or alternatively used to manage heat in the plurality of cores 102*a,b,c*. For example, in some instances, the power supply 106 may include a cooling fan or blower to provide cooling flowable over the respective instance of the electrolyzer 108 in the same one of the core 102*a*, the core 102*b*, or the core 102*c* to remove heat from the electrolyzer 108. This may be useful, for example, for facilitating rapid heat-up of the electrolyzer 108 upon start-up, when the power-supply 106 is not providing cooling. As another example, the heat exchanger 130 of the heat exchange module 114 may be in thermal communication with each instance of the power supply 106 such that the heat exchange module 114 may remove heat from both the power supply 106 and the electrolyzer 108 of a given one of the core 102*a*, the core 102*b*, or the core 102*c*.

In general, the compression module 116 may include a compressor 134 in fluid communication with each instance of the electrolyzer 108 of the plurality of cores 102*a,b,c* to receive the hydrogen produced. The compressor 134 may, in turn, compress the hydrogen for storage in the storage module 118. Given that the compression of hydrogen produces heat, the heat from the compression of hydrogen in the compression module 116 may be advantageously captured and used elsewhere in the system 100. Thus, for example, the compression module 116 may be in thermal communication with the heat exchange module 114 such that heat from the compression module 116 may be transformed into higher quality heat, transformed into electricity, and/or directed to one or more other portions of the system 100 according to any one or more of the techniques described herein.

While the hub 104 has been described as including certain modules, it shall be appreciated that additional or alternative modules are possible. For example, in some instances, the hub 104 may include a telemetry module 136 in electrical communication with the plurality of cores 102*a,b,c* to receive information related to performance of the plurality of cores 102*a,b,c*. Further, or instead, the hub 104 may include a dispensing module 139 in fluid communication with one or more of the compression module 116 or the storage module 118 to control dispensation of hydrogen according to downstream demand.

As another example, the hub 104 may additionally, or alternatively, include an application module 138 that makes downstream use of the hydrogen produced by the system 100. For example, the application module 138 may be a combustion power generation plant. In such instances, the application module 138 may make use of oxygen (e.g., in an oxy-fuel combustion process to produce $CO_2$-sequesterable carbon and lower $NO_x$) as produced as a reaction byproduct in the generation of hydrogen from electrolysis of water. Additionally, or alternatively, the application module 138 may be a steel production plant that may use hydrogen for the production of steel and oxygen for welding or cutting of steel. In some instances, the application module 138 may include one or more of a semiconductor device foundry or a chemical plant that use hydrogen to produce semiconductor devices or chemicals, respectively.

As still another example, the hub 104 may include a nitrogen module 140 that produces nitrogen (e.g., from air) and may direct nitrogen to each instance of the electrolyzer 108 of the plurality of cores 102*a,b,c*.

As still another example shown in FIG. 1B, the hub 104 may include a controller 142 including a processing unit 144 and a non-transitory computer-readable storage medium 146 having stored thereon computer readable instructions for causing the processing unit 144 to carry out any one or more of the various different control techniques described herein. In one embodiment, the firmware of the processing unit 144 which is responsible for safety operation and state machines of the processing unit 144 are split out from the operating script for the system to allow for only flashing of controls script logic without affecting safety logic or state machine logic. The system 100 which can operate in the presence of system faults.

Figure 2A:
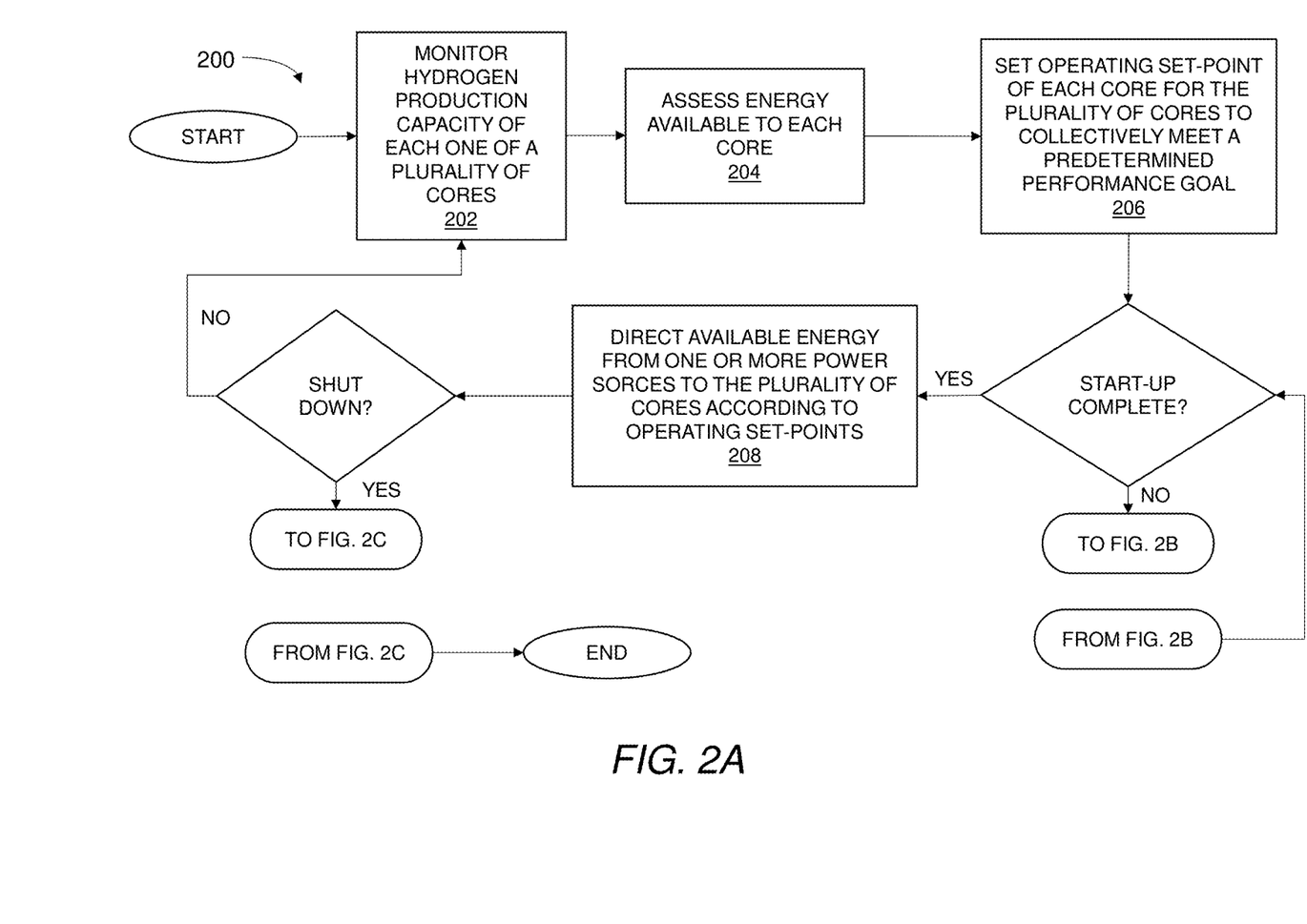
FIGS. 2A, 2B, and 2C are flow charts of exemplary methods of forming hydrogen according to various embodiments, the methods setting operating set-points of a plurality of cores, with each core including a power supply and an electrolyzer.

Referring now to FIG. 2A, an exemplary method 200 of controlling a modular system for hydrogen generation may be carried out using any one or more of the various different aspects of systems described herein. Thus, for example, the exemplary method 200 may be carried out using the system 100. More specifically, unless otherwise specified or made clear from the context, the exemplary method 200 shall be understood to be executable by the processing unit 144 according to computer-readable instructions stored on the non-transitory computer-readable storage medium of the controller 142 (shown in FIG. 1B).

As shown in step 202, the exemplary method 200 may include monitoring a respective hydrogen production capacity of each core of a plurality of cores. Each core may be any one or more of the various different cores described herein and, thus, may include an electrolyzer and a power supply in electrical communication with one another. Monitoring the respective hydrogen production capacity of each core may include, for example, detecting power available to the respective electrolyzer of each core. In instances in which the power supply of each core in the plurality of cores is redundant to the power supply of at least one other core of the plurality of cores, detecting power available to the respective electrolyzer of each core may be based on a first available power output of the power supply corresponding to the given core and a second available power output of one or more power supplies redundant to the power supply of the given core. As described in greater detail below, in instances in which the total available power to a given core corresponds to a hydrogen production capacity below a rated hydrogen output for the core, the total available power to the core may limit the amount of hydrogen that may be produced from the core.

While hydrogen production capacity of a given core may be based on the condition of the power supply and any associated redundant power supplies, it shall be appreciated that the hydrogen production capacity of the core may be additionally, or alternatively, based on the condition of the electrolyzer. For example, in instances in which the electrolyzer includes an electrochemical stack, monitoring the hydrogen production capacity of the core that includes such an electrolyzer may include sending a signal to the power supply of the respective core to send a current interrupt or ripple function to the electrochemical stack and receiving a current interrupt impedance measurement of the electrochemical stack in response to the current interrupt or ripple function. The current impedance measurement may be an electrochemical impedance spectroscopy (EIS) measurement. In turn, the current interrupt impedance measurement may provide an indication of the amount of input power lost the electrochemical stack. As the electrochemical stack ages, this loss may increase over time. Thus, by monitoring this degradation, adjustments to operating setpoints of one or more other cores in the plurality of cores may be made to offset such degradation. Thus, the EIS measurements may be carried out during steady-state operation, shut-down procedure or start-up or recovery procedure.

As shown in step 204, the exemplary method 200 may include assessing power available to the plurality of cores from one or more power sources. For example, in instances in which the plurality of cores receive power from one or more local power sources, it shall be appreciated the available power from such one or more local power sources may vary significantly over time. This may be particularly the case with intermittent power sources. Accordingly, in some instances, assessing power available to the plurality of cores may include determining an amount of power available from one or more intermittent power sources, as it may be advantageous (e.g., to reduce the need to store such intermittent power) to use such intermittent power before other sources of nominally constant power sources. Further, or instead, assessing power available to the plurality of cores from one or more power sources may include determining an amount of stored in one or more batteries in electrical communication with the respective power supply of each core, as such stored power may be advantageously used to smooth intermittency of power from an intermittent power source.

As shown in step 206, the exemplary method 200 may include setting a respective operating set-point of each core in the plurality of cores such that the plurality of cores collectively meet a predetermined performance goal. As used in this context, the predetermined performance goal may be any one or more of various different goals that may be associated with operation of a modular system for hydrogen generation and, in particular, operation of such a system to reduce the likelihood of unscheduled interruptions in hydrogen production. For example, the predetermine performance goal may include balancing total power collectively required for the operating set-points of the plurality of cores with the amount of power available from the intermittent power source. Additionally, or alternatively, the predetermined performance goal may include maximum power point tracking of the intermittent power source such that the total power collectively required for the operating set-points of the plurality of cores corresponds to maximum available power from the intermittent power source without requiring excess power from other sources.

In one example, the power source 120 comprises a photovoltaic array which is directly tied to the core 102 which tracks the photovoltaic array output power. In another example, the power source 120 comprises a wind power source (e.g., wind turbine) which is directly tied to the core 102 which tracks the wind generation output power. In another example, the electric grid power source 120 provides more power to the cores 102 in off peak times, and less power to the cores 102 in peak times to enable load leveling the grid As another example, the predetermined performance goal may include a target overall efficiency of the plurality of cores. Such efficiency may be measured with respect to any one or more of various different parameters of the system. For example, the target overall efficiency may correspond to maximizing a product value-to-cost ratio. In this context, the product value may be based on a production requirement forecast for hydrogen, oxygen, and heat, and the cost may be based on current electricity prices.

In general, to achieve the performance goal through collective operation of the plurality of cores, setting the operating set-point for an individual core may be based on the hydrogen production capacity for the given core and/or the power available to the core from the one or more power sources. For example, if the first available power output (from the primary power supply) to the core and the second available power output (from one or more power supplies providing redundant power) to the core each correspond to hydrogen production capacity less than a rated hydrogen output of the given core, the operating set-point of the given core may be set according to the greater of the first available power output or the second available power output. In some cases, the operating set-point of one or more other cores may be adjusted to compensate for this lower hydrogen output. That is, if the respective hydrogen production capacity of one of the cores in the plurality of cores is less than a rated hydrogen output for the respective core, setting the respective operating set-point of each core in the plurality of cores includes setting an operating set-point of at least one other core in the plurality of cores above a rated hydrogen output for the at least one other core. Stated differently, in some instances, the total hydrogen output from the plurality of cores may be maintained substantially constant (e.g., varying by less than about ±10 percent). In certain implementations, setting the respective operating set-point of each core in the plurality of cores may additionally, or alternatively, include adding additional cores to the plurality of cores, as may be useful for achieving a predetermined performance goal including maintaining a substantially constant voltage (e.g., varying by less than about ±10 percent) through the plurality of cores during full power operation.

As shown in step 208, the exemplary method 200 may include directing the available power from the one or more power sources to the plurality of cores according to the respective operating set-point of each core. In certain instances, this may include checking impedance of wiring of each core and interrupting the available power directed to at least the respective core if the impedance of the wiring is above a predetermined threshold. That is, if the impedance of the wiring associated with a given core appears to be indicative of a short circuit condition, power to the given core may be interrupted and/or redirected to one or more other cores.

Figure 2B:
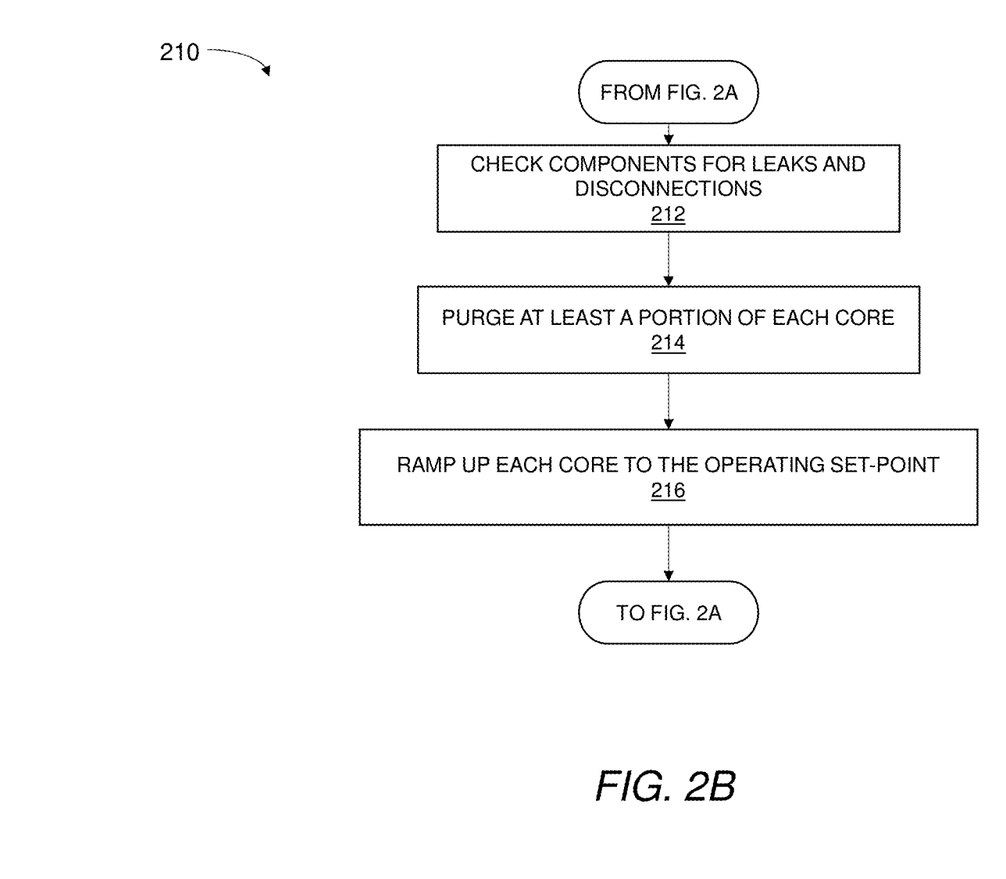
Figure 2C:
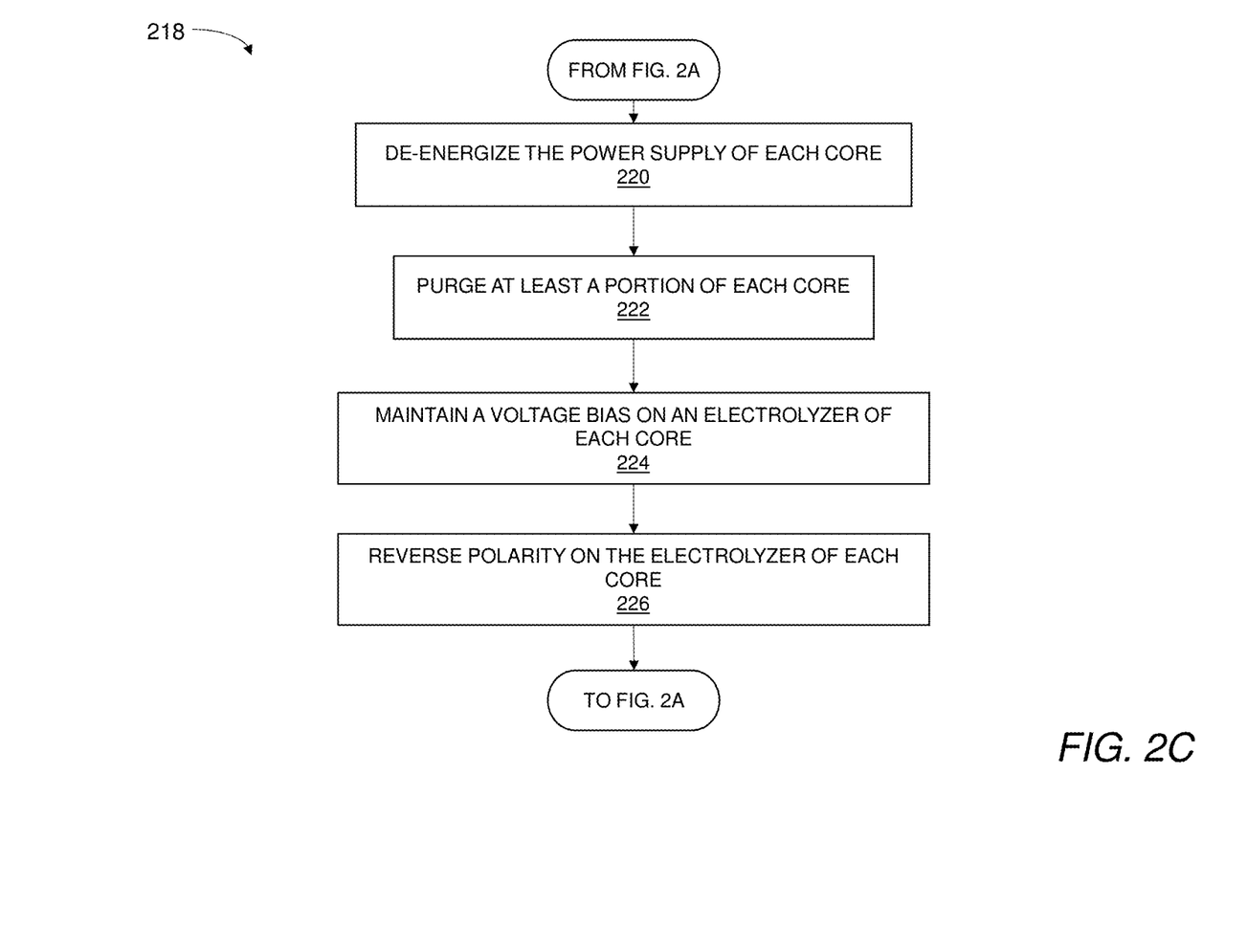

Referring now to FIGS. 2A-2C, the exemplary method 200 may further include carrying out one or more additional protocols associated with safety and productivity of the system.

As shown in FIG. 2B, the exemplary method 200 may include executing a start-up protocol 210 for the plurality of cores.

As shown in step 212, the start-up protocol 210 may include, for example, a leak testing step. The components are tested for leaks by pressurizing components of each core and interrupting the start-up protocol if a pressure decay beyond a predetermined threshold is detected in one or more of the pressurized components of the respective core. Specifically, the leak testing may be conducted by pressurizing hydrogen and water and coolant lines, then checking for pressure decay, and only continuing operation if the pressure is maintained high as indicating a non-leaking condition. The start-up protocol 210 may also include electrical disconnection testing. The electrical wiring and connections are with electrical impedance checks and the system is allowed to continue to operate only if the impedance of the wiring and connections is below threshold values and/or not showing the signatures of a short or open circuit fault.

As shown in step 214, the start-up protocol 210 may include purging at least a portion of the core (e.g., the electrolyzer) with an inert gas or oxygen-depleted air. Such oxygen depleted air may have, for example, about 16 percent oxygen or less and may be formed according to any one or more of various different techniques for removing oxygen from air, such as oxygen pumping, thermal swing absorption, pressure swing adsorption, a hybrid generator, or a cascaded oxygen removal process used to create nitrogen in the formation of ammonia. As used herein, such oxygen-depleted air may be delivered to the plurality of cores via the nitrogen module 240 of a hub. Further or instead, in instances in which each core includes a fuel cell as an auxiliary power source, the start-up protocol may include directing hydrogen to the fuel cell to provide power for start-up and warm-up of the respective core.

As shown in step 216, the start-up protocol of step 210 may include ramping up each core to the respective operating set-point of the given core. The ramping protocol may be a predetermined protocol based on one or more considerations related to safety and/or component health.

As shown in FIG. 2C, the exemplary method 200 may include executing a shut-down protocol 218 for the plurality of cores. a shut-down protocol of the exemplary method 200 may include executing a shut-down protocol for the plurality of cores.

As shown in step 220, the shut-down protocol 218 may include de-energizing the power supply of each core.

As shown in step 222, the shut-down protocol 218 may include purging at least a portion of the core (e.g., the electrolyzer) with an inert gas (e.g., nitrogen) or oxygen-depleted air, as described above.

As shown in step 224, the shut-down protocol 218 may include maintaining a voltage bias on the electrolyzer. Holding the bias on the electrolyzer may be carried out, for example, by a battery and/or auxiliary power supply in electrical communication with the electrolyzer. For example, the electrolyzer may be operated in a night-time mode using a small flow of water to produce a small quantity of hydrogen. This may advantageously reduce the number of start-stop cycles for the electrolyzer that may otherwise degrade performance of the electrolyzer. In instances in which the electrolyzer includes an electrochemical stack, maintaining the voltage bias on the electrolyzer may include maintaining the bias to on the anode to maintain hydrogen on the cathode side or maintaining the voltage bias on the cathode to pump oxygen back into the water. More generally, maintaining bias on the electrochemical stack may be useful for assessing conditions of health (e.g., current or hydrogen pumping anode to cathode at low voltage) in the electrolyzer stack during a healthy shut-down.

As shown in step 226, the shut-down protocol of step 218 may include reversing polarity of a DC power supply associated with the electrolyzer of the given core. Such reversal of polarity may be useful, for example, for driving off material accumulated on an electrochemical cell in instance in which the electrolyzer includes such an electrochemical cell.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A modular system for hydrogen generation, comprising:
   a plurality of cores, wherein each core includes an electrolyzer and a power supply, and the power supply of each core is operable to manage electrical power to the electrolyzer of the core; and
   a hub including a water module, a heat exchange module, and a switchgear module, wherein the water module comprises a water source in fluid communication with the electrolyzer of each one of the plurality of cores, the heat exchange module comprises a heat exchanger in thermal communication with the electrolyzer of each one of the plurality of cores, and the switchgear module comprises a switch activatable to electrically isolate the power supply of each one of the plurality of cores.

2. The modular system of claim 1, wherein the power supply of each core is hot swappable while the respective electrolyzer of the core is in operation.

3. The modular system of claim 1, wherein each power supply is in thermal communication with the heat exchanger.

4. The modular system of claim 1, wherein each power supply is connected to both a DC electric power source and an AC electric power source.

5. The modular system of claim 1, wherein each power supply is configured to provide a first DC voltage to the electrolyzer of the core and to provide a second DC voltage lower than the first DC voltage to auxiliary devices of the core.

6. The modular system of claim 1, wherein each core further includes an auxiliary power source in electrical communication with the respective electrolyzer of the given core.

7. The modular system of claim 1, wherein the electrolyzer includes an electrochemical stack, water from the water module is receivable into the electrochemical stack, and the electrochemical stack is configured to receive electrical power from the power supply and to generate hydrogen and oxygen from the water.

8. The modular system of claim 7, wherein the electrochemical stack comprises at least one of a proton exchange membrane stack, a solid oxide electrolysis stack, an alkaline cell stack, or a combination thereof.

9. The modular system of claim 1, wherein the hub further comprises:
   a compression module including a compressor in fluid communication with the electrolyzer of each core; and
   a storage module in fluid communication with the compression module.

10. The modular system of claim 1, wherein the heat exchange module comprises a thermal loop, and the heat exchanger is in thermal communication with each of the plurality of cores via the thermal loop.

11. The modular system of claim 10, wherein the heat exchanger and the thermal loop form at least a portion of a heat pump operable to convert waste heat from the plurality of cores to heat deliverable to one or more other portions of the hub.

12. The modular system of claim 1, wherein each of the water module, the heat exchange module, and the switchgear module is replaceable through at least one of disconnection of only one electrical connection, only one fluid connection, or only one thermal connection.

13. The modular system of claim 4, wherein each power supply is configured to provide DC electric power to the electrolyzer of each core.

14. The modular system of claim 1, wherein the power supply comprises one or more of an inverter, rectifier, and a transformer.

15. The modular system of claim 1, wherein the DC electric power source and the AC electric power source each comprise a photovoltaic array.

16. The modular system of claim 1 the DC electric power source and the AC electric power source each comprise an electrical grid.

17. The modular system of claim 1, wherein the power supply of each core is redundant to the power supply of at least another one of the plurality of cores.

18. The modular system of claim 1, wherein the water module further comprises a pump in fluid communication with the water source and a filter in fluid communication with the water source.

\* \* \* \* \*